Nov. 17, 1925.
M. HOUDAILLE
SUSPENSION FOR VEHICLES
Filed July 13, 1923
1,561,542
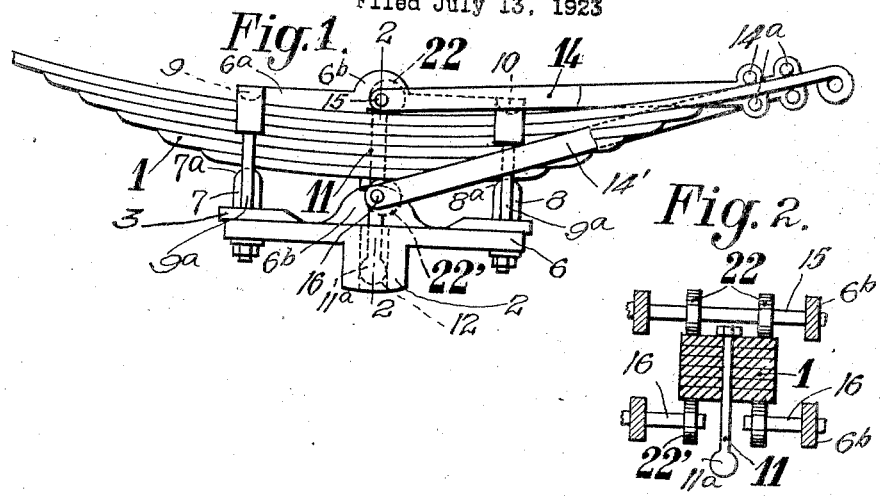
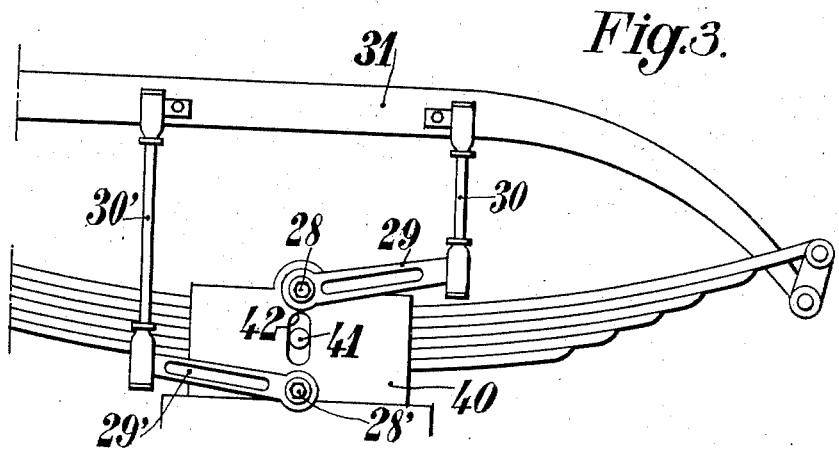
Inventor
M. Houdaille
By Marks & Clerk
Attys.

Patented Nov. 17, 1925.

1,561,542

UNITED STATES PATENT OFFICE.

MAURICE HOUDAILLE, OF LEVALLOIS-PERRET, FRANCE.

SUSPENSION FOR VEHICLES.

Application filed July 13, 1923. Serial No. 651,380.

*To all whom it may concern:*

Be it known that I, MAURICE HOUDAILLE, a citizen of the French Republic, of 50 Rue Raspail, Levallois-Perret, Seine, France, have invented new and useful Improvements in a Suspension for Vehicles, of which the following is the specification.

This invention has essentially for its object a vehicle suspension, the flexibility of which is modified as the chassis is placed at a greater or less distance from the axle, that is to say, as the springs are more or less distorted.

The invention is illustrated in the accompanying drawing in which:

Figure 1 is a side view of a vehicle spring provided with my improvements.

Fig. 2 is a vertical sectional view of a portion of the same taken on line 2—2 of Figure 1.

Fig. 3 is a side view of a modification.

In the suspension illustrated in Figures 1 and 2, the leaf spring 1 rests on the axle 2 through the medium of a lower plate 3, which is integral with the axle and has posts 7 and 8 at its ends provided with semi-cylindrical surfaces 7ª and 8ª, with which the spring 1 is in contact.

Arranged above the spring is an upper plate 6ª provided at its ends with semi-cylindrical surfaces 9 and 10 which contact with the upper leaf of the spring. The plates 6 and 6ª are secured together by bolts 9ª and due to the construction just described, the spring is held only by surfaces of very reduced width, sufficient for ensuring a strong connection but which do not prevent the relative distortion of the springs or the relative displacements of the leaves of the spring.

A steadying pin 11 connects the leaves at their central portions and is preferably provided at its lower end with a ball 11ª guided in a bore 12 in the axle.

The plates 6 and 6ª have their central portions enlarged as shown at 6ᵇ to form bearings in which the ends of shafts 15 and 16 are mounted. These shafts carry fixed cams 22 and 22', which bear respectively on the top and bottom of the spring 1, and when the cams are turned they tend to tighten on the central portion of the spring. The shafts 15 and 16 are provided at their outer ends with levers 14 and 14' which are fixed to the shafts and have their outer ends provided with rollers or the like 14ª which contact with the upper leaf of the spring 1. Due to this construction the cams will be turned each time the axle moves relatively to the chassis and vice versa.

The cams 22 and 22' may also be controlled as shown in Fig. 3. In this case their shafts 28 and 28' are rigidly connected to levers 29 and 29' connected to the frame 31 by ball jointed links 30 and 31'. It is obvious that when the chassis 31 moves toward the axle or vice versa, that the levers 29 and 29' will be turned to adjust the cams.

It is to be noted that, as shown in Fig. 3, the whole of the adjusting device can be enclosed in a casing 40 fixed to the axle. A shaft 41 fixed to the spring, passes through a slot 42 in this casing to permit the relative vertical displacements of the central portion of the spring and of the axle. It may be seen that by this means, it is possible, to effect the thrust by the springs, since the casing 40 is rigid with the axle and transmits its thrusts to the shaft 41.

From the foregoing it is believed that the construction, operation and advantage of the invention may be readily understood by those skilled in the art, and it is apparent that changes may be made in the details disclosed without departing from the spirit of the invention as expressed in the claim.

What I claim as my invention and desire to secure by Letters-Patent is:—

In a suspension for vehicles, an axle member and a chassis member, a leaf spring, a lower supporting plate for said spring arranged on the axle, semi-cylindrical projections on the plate contacting at spaced points with the underside of the spring, upper semi-cylindrical projections bearing at spaced points on the top of the spring, cams in contact with the upper face and the lower face of the spring, shafts on which cams are secured, bearings fixed relatively to the said axle member and supporting said shafts, and levers fixed to said shafts, said levers being arranged to automatically rotate when the chassis member and axle are subjected to relative displacements, for turning said cams.

In testimony whereof I have signed my name to this specification.

MAURICE HOUDAILLE.